United States Patent [19]

Pröepper

[11] Patent Number: 4,767,031

[45] Date of Patent: Aug. 30, 1988

[54] DOSING AND FILLING OF FLUID OR PASTY MASSES, IN PARTICULAR NUTRIENT MATERIALS WHICH ARE TO BE KEPT FREE OF CONTAMINANTS, SUCH AS MILK, YOGURT, PUDDING, DESSERT OR THE LIKE INTO CONTAINERS

[75] Inventor: Wilhelm Pröepper, Langenfeld, Fed. Rep. of Germany

[73] Assignee: Benz & Hilgers GmbH, Duesseldorf, Fed. Rep. of Germany

[21] Appl. No.: 72,824

[22] Filed: Jul. 13, 1987

[30] Foreign Application Priority Data

Jul. 11, 1986 [DE] Fed. Rep. of Germany ....... 3623417

[51] Int. Cl.⁴ .............................................. B67D 5/52
[52] U.S. Cl. .................................... 222/255; 222/276; 222/330; 222/380; 417/517; 141/261
[58] Field of Search ................. 417/517; 141/258, 260, 141/261; 222/129, 135, 137, 252, 255, 262, 372, 376, 379–380, 409, 330, 478, 481, 484–485, 265, 275, 276

[56] References Cited

U.S. PATENT DOCUMENTS

| 3,168,225 | 2/1965 | Miller et al. ......................... 222/380 |
| 3,246,808 | 4/1966 | Lidell et al. ....................... 222/380 X |
| 4,014,629 | 3/1977 | Elsworth .............................. 417/259 |
| 4,319,517 | 3/1982 | McCaleb .......................... 141/258 X |
| 4,341,329 | 7/1982 | Kuemmerer et al. ............... 222/275 |
| 4,565,304 | 1/1986 | Dronet ................................. 222/108 |
| 4,621,747 | 11/1986 | van der Velde et al. ............ 222/137 |

FOREIGN PATENT DOCUMENTS 2134207 1/1973 Fed. Rep. of Germany .
2321205 11/1974 Fed. Rep. of Germany .

Primary Examiner—Michael S. Huppert
Attorney, Agent, or Firm—Klein and Vibber

[57] ABSTRACT

The invention relates to a dosing and filling arrangement for containers of fluid or pasty masses, in particular contaminant-free nutrient material, such as milk, yogurt, pudding, desserts or the like. The arrangement includes a housing having two axially movable pistons. A first of such two pistons is a dosing piston and a second independently movable piston is the valve piston which is coaxially arranged relative to the dosing piston. The arrangement also has a mouthpiece on the lower side of the housing which is coaxial with the dosing and valve pistons. The valve piston rod is centrally arranged in a bore of the dosing piston and the hollow piston rod of the dosing piston is slidably movable in a cylinder of the housing. The piston rod has advantageously a plurality of equiangularly disposed longitudinal slots disposed on its periphery. The piston rod has a first control collar which coacts with the mouthpiece of the housing. This first control collar is connected via a push rod to a second control collar. Such a dosing arrangement makes possible a gentle filling operation as well as an easy cleaning of the arrangment. The arrangement, moreover, is, due to its simple construction inexpensive to manufacture.

9 Claims, 3 Drawing Sheets

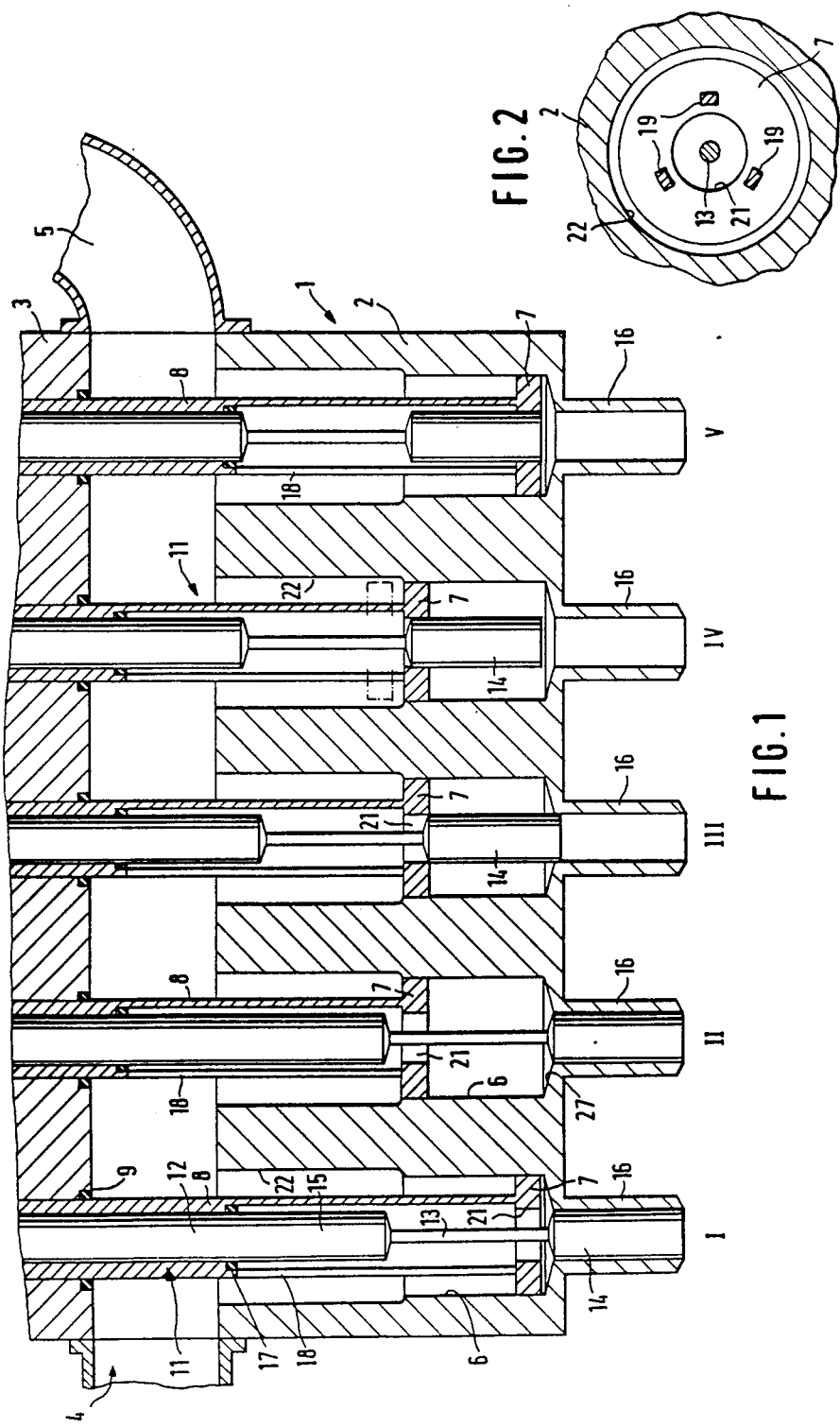

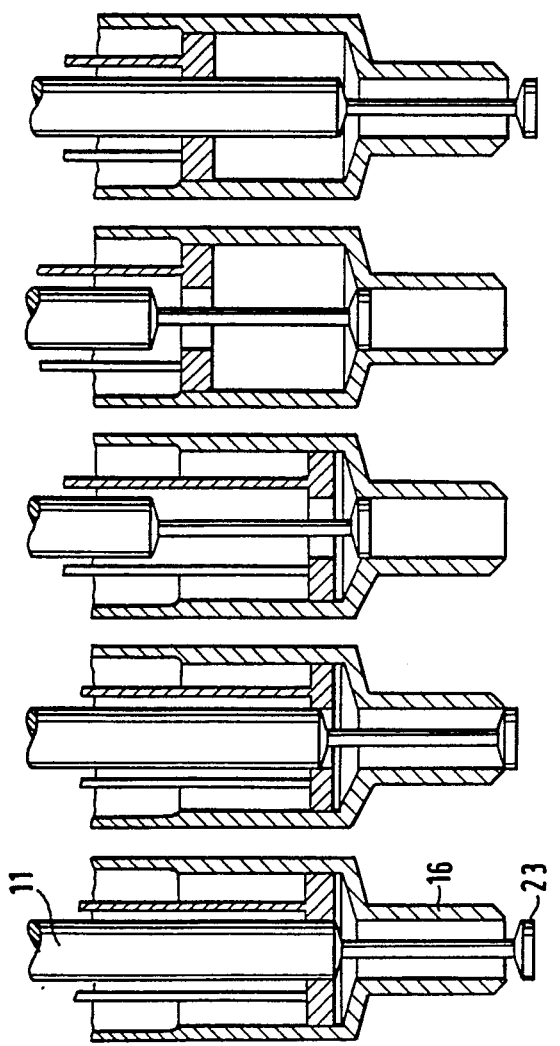
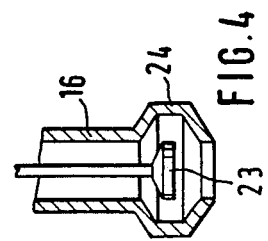

DOSING AND FILLING OF FLUID OR PASTY MASSES, IN PARTICULAR NUTRIENT MATERIALS WHICH ARE TO BE KEPT FREE OF CONTAMINANTS, SUCH AS MILK, YOGURT, PUDDING, DESSERT OR THE LIKE INTO CONTAINERS

BACKGROUND OF THE INVENTION

The invention relates to a dosing and filling arrangement for filling containers with milk, yogurt, pudding, desserts or the like, with a fluid or pasty mass, in particular a mass of nutrient material which is to be maintained in a sterile contaminant-free condition. Such dosing arrangement generally includes a mouthpiece and a housing provided with a feed conduit, in which an axially movable dosing piston is arranged, which coacts with an independently adjustable piston valve.

A dosing arrangement of the afore-described type is already known and described in German published application Ser. No. 2321205. Such a dosing arrangement, respectively filling arrangement, operates generally in a satisfactory manner. Such arrangement has, however, the drawback that it requires in addition to the dosing piston cylinder arrangement a second cylinder, in which the valve piston reciprocates, which makes the manufacture of such an arrangement rather complex and costly. In particular, the passages and channels between the dosing piston cylinder and the control piston cylinder are costly to manufacture. In addition thereto, the product flow must be deflected during the intake and filling operations and the filling material cannot be pushed out of the dosing chamber without residues remaining therein. Finally, a plurality of chambers, respectively cylinders, must be sealed during the periodic cleaning of the dosing arrangement and must be particularly carefully cleaned. Such a known dosing arrangement also has a comparatively broad shape, which is particularly disadvantageous when several banks of filling arrangements, respectively filling machines, are used.

SUMMARY OF THE INVENTION

It is an object of this invention to provide a dosing arrangement of the afore-described type which operates in a wear-resistant manner and can be easily and thoroughly cleaned and has an inexpensive and simple construction.

This object of the invention is achieved in that the dosing piston and the valve piston are coaxially arranged in a common cylinder of the housing and that a valve rod of the valve piston is centrally guided in the bore of the dosing piston and that the piston rod of the dosing piston is hollow.

Thus, one achieves with the new construction of this invention a dosing arrangement in which the dosing piston and valve piston are mounted in a single chamber, respectively in a common cylinder. In this way the stream of the dosed product is linear and the filling product is better and more compactly filled in the container. In addition thereto, such a construction is inexpensive to manufacture because the individual parts are essentially pure profile-machine-turned parts and can operate with comparatively few seals. Moreover, such a construction is much more narrow in profile and when several banks of filling machines are used the product feed can be achieved directly through the dosing block of the arrangement. In addition thereto, the arrangement of the invention permits for a much improved cleaning operation, which, is generally only effected when the dosing piston is slidably displaced into a predetermined position. Dead spaces in which contaminants can collect are not present in the device of this invention.

The advantages of the arrangement of this invention are particularly noticeable when the piston rod of the dosing piston has distributed on its periphery a plurality of longitudinal recesses which are separated from each other by side bars or straps and when a valve rod has a first control collar which coacts with the mouthpiece of the housing and has a second control collar which is joined to the first control collar by means of a more slender push rod. Such a dosing arrangement has the advantage that the product streams during the sucking intake as well as the expulsion stroke so that it never is in a quiescent state. Such an arrangement has a relatively large expulsion capacity.

The first control collar can occupy essentially the entire axial length of the mouthpiece of the housing, or can also be constructed so that it is formed as a flat disc and forms a valve seal at the inlet end as well as at the outlet end of the mouthpiece. The outlet end of the mouthpiece may be provided with an enlarged head, so that the product converges again into a strand at the outlet of the mouthpiece.

When a filling machine having a plurality of filling paths is provided, the second control collar of each filling path can be joined with a corresponding control collar of one or a plurality of adjacent paths via a common traverse, so that the adjustment and coordination of the arrangement is simplified.

It has been established that it is particularly advantageous when the transfer region between the cylinder of the housing and the mouthpiece is flat-conically shaped and simultaneously also the dosing piston at its underside is correspondingly conically shaped. Thereby there is first of all guaranteed an improved product run and on the other hand that the entire product is completely expelled and thereby no residue remains in the cylinder.

The cleaning of the arrangement is finally still further improved when an enlarged chamber is provided above the dosing piston for the required control path of the dosing piston which space has for cleaning purposes a larger diameter than the cylinder in which the dosing piston reciprocates.

BRIEF DESCRIPTION OF THE DRAWINGS

The above and other features and advantages will become more readily apparent from the following, reference being made to the accompanying drawing, in which:

FIG. 1 is a schematic cross-sectional view of a dosing arrangement for a plural-path filling arrangement, whereby the dosing pistons and their valve pistons are shown in different operative positions;

FIG. 2 is a cross-section through one the dosing pistons;

FIG. 3 is a further embodiment of the dosing arrangement of the invention;

FIG. 4 illustrates in cross-section an alternate version of the mouthpiece of the dosing arrangement;

DETAILED DESCRIPTION

Figure 5:
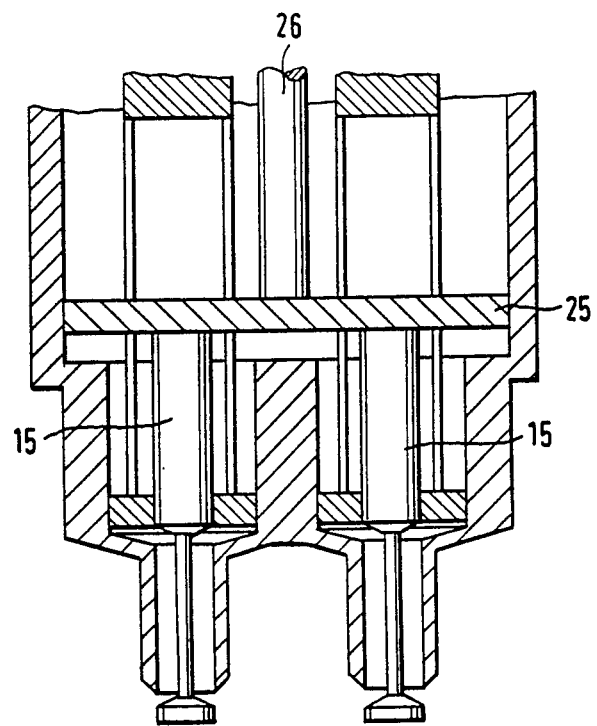
FIG. 5 is a further constructional embodiment of the control mechanism for the valve piston of the arrangement.

FIG. 1 illustrates a plural-path filling machine in which certain constructional details have been omitted. This filling machines includes a dosing arrangement with a dosing block 1. The dosing block 1 includes a housing 2 which has a cover 3 covering its upper end. There is disposed between the cover 3 and the housing 2 a product feed channel 4. This feed channel is represented by a bore or opening and has at the right end of the dosing block 1 a compensation chamber 5 for a non-illustrated compensation piston. Since the individual units of the dosing arrangement are identically constructed, it is sufficient in principle, to only describe in detail one of the units. For sake of simplicity, however, the filling process is described as far as its operation is concerned from the left to the right in conjunction with the dosing block 1.

There is mounted in a cylinder 6 of the housing 2 a dosing piston 7 which is axially slidably mounted with the aid of a hollow piston rod 8. This piston rod 8 is sealed by means of a sealing ring 9 with respect to the cover 3. There is axially movably mounted in the hollow piston rod 8 a valve piston 11. This valve piston 11 includes a valve rod 12, a pusher rod 13 as well as a control collar 14 and a second control collar 15. The first control collar 14 has a length which is about the length of a mouthpiece 16 of the housing 2, whereas the second control collar 15 is longer and is slidably guided in the hollow piston rod 8 by means of an intermediate sealing ring 17.

The piston rod 8 has a longitudinal recess 18 which extends down to the dosing piston 7 as is clearly shown from the cross-sectional view of FIG. 2. There are three longitudinal recesses equiangularly disposed about the axis of the piston rod 8 which recesses are separated from each other by the bars or straps 19. In addition thereto the dosing piston 7 has a longitudinal bore 21 which coacts with the first control collar 14.

In addition thereto the housing 2 has a plurality of chambers 22. The diameter of each chamber 22 is somewhat larger than the diameter of the corresponding cylinder 6, which chamber 22 acts as a return stroke chamber into which the dosing piston is positioned during a cleaning operation which will be described in detail hereinafter.

MANNER OF OPERATION OF THE DOSING ARRANGEMENT

There is illustrated in the left-most portion of FIG. 1 the position of the dosing piston 7 and the valve piston 11 when these two pistons are at the end of the expulsion stroke of the dosing arrangement. This means that the dosing piston 7 has reached its lower-most position and that by means of the first control collar 14 of the valve piston 11, the mouthpiece 16 is fully closed. For the purpose of receiving new material from the product feed conduit 4, the dosing piston 7 is then moved upwardly into the position II which is a starting position as illustrated in FIG. 1. As the dosing piston 7 moves upwardly, the raw material product is sucked into the lower portion of the cylinder 6 via the longitudinal bore 21 and the longitudinal slits of the dosing piston 7, respectively the piston rod 8. Thereafter, the arrangement is brought into the position III as illustrated in FIG. 1, wherein the valve piston 11 is moved upwardly into a position wherein the lower end of the control collar 14 causes the inlet end of the mouthpiece 16, and simultaneously also the dosing piston 7, to be closed in the region of its longitudinal bores 21. Thereafter the valve piston 11 is moved further upwardly in the position IV shown in dashed lines of FIG. 1 until the inlet end of the mouthpiece 16 and the bore 21 are open by positioning of the first control collar 14 as illustrated in FIG. 1. Thereafter the expulsion of the filling material is carried out and this is done by the dosing piston 7 being slidably displaced in the position V of FIG. 1, so that the filling product material, which is positioned at its front side, is expelled via the mouthpiece 16 into the nonillustrated container. Simultaneously with this expulsion process, new raw material is fed from the product feed channel 4 via the longitudinal recesses 18 into the piston rod 8, so that during expulsion as well as during sucking raw material is received by the arrangement.

If the arrangement is to be brought into a cleaning position, it is for example, started when the arrangement is in the position IV in FIG. 1. The dosing piston 7 is simply slidably displaced in the position shown in dashed lines. The valve piston 11 is already positioned in a position in which it can be rinsed from all sides by means of a cleaning fluid which can be fed, for example via the product feed channel.

The alternate embodiment of FIG. 3 differentiates itself from that of FIGS. 1 and 2 only by the fact that the first lower control collar is constructed as a flat disc 23, so that by means of corresponding axial displacements of the valve piston 11, the outlet end of the mouthpiece as well as the inlet end of the mouthpiece 16 (positions III and IV of FIG. 1) can be closed. During filling the flat disc 23 exits from the mouthpiece 16. Otherwise the functioning is the same as that of the embodiment of FIGS. 1 and 2.

A further alternate embodiment, illustrated in FIG. 4, resides in that the mouthpiece 16 has an enlarged outlet 24 so that the product during filling is again converted into a strand after passing the disc 23 (see FIG. 4).

When a plural-path filling arrangement is used, it is, for example, possible to join via a common traverse 25, the rear second control collars 15 of adjacent valve pistons 11. This common traverse member 25 is then connected to a single valve rod 26. Thereby the control of the entire valve arrangement is considerably simplified (see FIG. 5).

Figure 6:
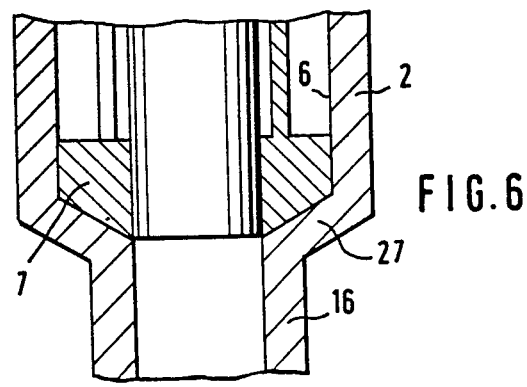
FIG. 6 is still a further embodiment of the dosing piston and the housing in which such piston is mounted.

Finally, it has also proven to be advantageous to construct a housing in the transfer region between the cylinder 6 and the mouthpiece 16 of a flat conical shape, respectively a flat conical transfer region 27 (see FIG. 6). In such an arrangement the dosing piston 7 is matingly flat-conically shaped at its underside. This renders the advantage that the entire product can be expelled from the cylinder 6 and thereby no residue of the filling product remains therein. Consequently, the contamination or the like of the arrangement is drastically reduced because such residue does not collect inside of the filling device.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

I claim:

1. An improved dosing arrangement for dosing and filling fluid or pasty nutrient materials into containers which are to be maintained in a sterile condition, such as milk, yogurt, pudding, desserts or the like, having a housing which is provided with at least one dispensing mouthpiece and a materials inlet feed channel and at least one axially movable dosing piston in which an independently controlled coacting valve piston is movably mounted, the improvement comprising said housing having a common cylinder for each coacting dosing and valve pistons;

said dosing piston and valve piston being coaxially reciprocally movably mounted in said cylinder;

said dosing piston being at least partially hollow and said valve piston being movably mounted in a bore of said dosing piston; and said valve piston having an upper and lower portion whose cross-sections have diameters that are substantially equal and correspond to the diameter of said bore; said upper and lower portions being connected to each other by an axially extending piston rod whose diameter is substantially smaller than the diameter of said upper and lower portions.

2. In a dosing arrangement as set forth in claim 1, wherein said dosing piston has a plurality of longitudinal slots which are separated from each other by longitudinally extending straps, said lower portion of said valve piston coacting with said dispensing mouthpiece.

3. In a dosing arrangement as set forth in claim 2, wherein the axial lengths of said lower portion and of said dispensing mouthpiece are substantially equal.

4. In a dosing arrangement as set forth in claim 2, wherein said lower portion has the shape of a flat disc.

5. In a dosing arrangement as set forth in claim 4, wherein said dispensing mouthpiece has a portion whose cross-section is larger than the cross-section of the remainder of the mouthpiece and larger than said flat disc.

6. In a dosing arrangement as set forth in claim 1, wherein said housing is provided with a plurality of said dosing and valve pistons, said upper portions are connected to each other by means of a common traverse member so as to jointly reciprocate in their respective cylinders.

7. In a dosing arrangement as set forth to claim 5, wherein said housing is provided with a plurality of said dosing and valve pistons, including a transfer region of a flat frusto-conical shape disposed between each said cylinder and dispensing mouthpience.

8. In a dosing arrangement as set forth in claim 7, wherein the portion of each said dosing piston which confronts the flat-frustoconically shaped transfer region has a mating frusto-conical shape.

9. In a dosing arrangement as set forth in claim 8, wherein each said cylinder has an upper portion and a lower portion, the cross-sections of each said dosing piston and lower portion having substantially equal diameters, whereas the upper portion of each said cylinder has a cross-section of slightly larger diameter than the cross-section of each said dosing piston so that the dosing piston can reciprocate therein for cleaning purposes and enhance the cleaning action.

* * * * *